US006556237B1

(12) United States Patent
Fredlund et al.

(10) Patent No.: US 6,556,237 B1
(45) Date of Patent: Apr. 29, 2003

(54) FIELD OF VIEW CORRECTION FOR AN IMAGE HANDLING DEVICE USING A NON-INTEGRAL ELECTRONIC CAMERA

(75) Inventors: John R. Fredlund, Rochester, NY (US); Raymond E. Wess, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/028,318

(22) Filed: Feb. 24, 1998

(51) Int. Cl.[7] ............................................... H04N 5/253
(52) U.S. Cl. ...................... 348/96; 382/162; 382/321
(58) Field of Search ............................ 348/96, 97, 64, 348/111, 112, 373, 231, 208, 294, 102; 358/488, 453, 538, 512; 382/162, 319, 313, 321

(56) References Cited

U.S. PATENT DOCUMENTS

| 4,458,270 | A | * | 7/1984 | Kuno et al. ................. 348/111 |
| 4,603,966 | A | | 8/1986 | Brownstein .................. 355/45 |
| 4,901,364 | A | * | 2/1990 | Faulkerson et al. ......... 382/313 |
| 5,194,958 | A | * | 3/1993 | Pearman et al. .............. 348/97 |
| 5,247,330 | A | | 9/1993 | Ohyama et al. ............... 355/64 |
| 5,249,056 | A | * | 9/1993 | Foung et al. ................. 348/97 |
| 5,278,669 | A | | 1/1994 | Takemoto .................... 358/453 |
| 5,293,242 | A | | 3/1994 | Mamiya ...................... 348/362 |
| 5,301,244 | A | * | 4/1994 | Parulski ...................... 382/162 |
| 5,337,164 | A | | 8/1994 | Yabe et al. .................. 358/487 |
| 5,351,139 | A | | 9/1994 | Miyahara et al. ............ 358/487 |
| 5,402,170 | A | | 3/1995 | Parulski et al. ............. 348/211 |
| 5,473,740 | A | | 12/1995 | Kasson ....................... 395/134 |
| 5,546,122 | A | | 8/1996 | Asami et al. ................. 348/96 |
| 5,581,299 | A | * | 12/1996 | Raney ......................... 348/64 |
| 5,600,450 | A | * | 2/1997 | Kaye et al. .................. 348/99 |

OTHER PUBLICATIONS

U.S. patent application Ser. No. 08/713,057, Fredlund et al., filed Sep. 12, 1996.

* cited by examiner

Primary Examiner—Gims S. Philippe
(74) Attorney, Agent, or Firm—David M. Woods

(57) ABSTRACT

An imaging system includes an electronic camera having a predetermined field of view for capturing images of image bearing media and a handling mechanism for supporting the image bearing media. The handling mechanism includes a framed region for revealing an image bearing area of the media to the electronic camera and means for supporting the electronic camera in a position that images the framed region while capturing a field of view larger than the image bearing area of the media. A processor associated with the electronic camera provides field of view correction of images captured from the image bearing media by initiating capture of an image of the framed region and determining the coordinates of the image bearing area from the image of the framed region. The coordinates of the image bearing area are then used for field of view correction of subsequently captured images.

24 Claims, 8 Drawing Sheets

FIELD OF VIEW CORRECTION FOR AN IMAGE HANDLING DEVICE USING A NON-INTEGRAL ELECTRONIC CAMERA

CROSS-REFERENCE TO RELATED APPLICATION(S)

Reference is made to commonly assigned copending application Ser. No. 08/713,057, entitled "Film Handling and Illuminating Mechanism for a Tethered Electronic Camera" and filed in the names of J. R. Fredlund, J. A. Manico and K. A. Parulski, which is assigned to the assignee of this application.

FIELD OF THE INVENTION

The invention relates to the field of electronic photography, and in particular to an electronic photographic system for capturing images, which are resident on image bearing media, and inputting the captured images to a computer. More specifically, the invention pertains to correction of optical alignment error in a system where an electronic camera is not integral with the image handling device.

BACKGROUND OF THE INVENTION

A typical approach for capturing images and inputting the captured images to a computer involves an electronic still camera designed to be directly tethered to the computer. For example, U.S. Pat. No. 5,402,170 describes a low cost electronic still camera tethered to a personal computer which provides image processing, storage, and display of the captured images. By relying on the computer to perform these tasks, the camera cost can be greatly reduced. Another example is the Kodak DVC 300 Digital Video Camera, which is attached by cable to a personal computer. The capture of images from image-bearing media, such as film, has usually involved stand-alone scanners. Such devices are expensive and complex, and are also usually dedicated to a single purpose, thus representing a high cost to the average consumer. For example, a color sequential scanner shown in U.S. Pat. No. 5,301,244 uses a computer to perform certain functions, such as color correction, but nonetheless represents a complex, specialized piece of equipment. This high cost for a single purpose device has minimized the utility of conventional photographic film as an image input for desktop computer systems.

In the above-mentioned copending Ser. No. 08/713,057, a relatively simple tethered digital camera is merged with a simple film handling mechanism in order to capture images resident on a film in a simple and inexpensive manner and transmit the captured images to a computer. The film handling mechanism includes a film gate, a housing for supporting the digital camera in a position that images the film gate, a film transport mechanism for transporting the film through the film gate, and an illuminator for illuminating the film gate and the film therewith. By configuring the housing to allow removal of the camera from the film handling mechanism, the user obtains a system which has the utility of normal camera input along with the ability to image film with the same camera. Pursuant to its computer connection, the film handling mechanism includes means responsive to an instruction from the computer for advancing the film frame by frame through the film gate in order to capture the images on the film.

In using a film handling mechanism such as described in copending Ser. No. 08/713,057, optical alignment between the separate components is a special problem. In particular, the difficulty of correctly pointing the camera toward the film gate must be overcome if the image is to be captured successfully. The camera must be adjusted such that the proper lateral pointing is achieved, or the captured image will be off-center. Additionally, if the magnification is not exactly as expected, the captured image may appear too small, or a portion of the image may be cropped. Tolerances necessary to ensure the proper positioning of the camera relative to the image bearing medium are difficult or impossible to achieve. In particular, when a camera is inserted into such a device, there is no guarantee the camera will be positioned such that it will be capturing the desired portion of the image bearing medium.

Generally, the user is forced to make tedious adjustments by trial and error to ensure the camera is capturing the desired portion. Additionally, the mechanisms necessary to make these adjustments increase the cost and complexity of the media handling device. In U.S. Pat. No. 5,278,669, scan data from an original is automatically separated from another portion other than the original without specifying the size of the original. In a prescanning operation, scan data including the original data is produced, Then, an image extracting circuit separates the original region from the other portion by comparing the density of scanned pixel values. This operation, however, is dependent upon the presence of the desired image, and must therefore be repeated for each image scan.

It would be preferable to have an electronic imaging system that can perform field of view correction once for each image capture session, rather than for each image capture.

SUMMARY OF THE INVENTION

The present invention is directed to overcoming one or more of the problems set forth above. Briefly summarized, according to one aspect of the present invention, an imaging system includes an electronic camera having a predetermined field of view for capturing images of image bearing media and a handling mechanism for supporting the image bearing media. The handling mechanism includes a framed region for revealing an image bearing area of the media to the electronic camera and means for supporting the electronic camera in a position that images the framed region while capturing a field of view larger than the image bearing area of the media. A processor associated with the electronic camera provides field of view correction of images captured from the image bearing media by initiating capture of an image of the framed region in the absence of an image bearing area of the media and determining the coordinates of the image bearing area from the image of the framed region. The coordinates of the image bearing area are then used for field of view correction of subsequently captured images. The processor may be located in the electronic camera, or preferably in a host computer attached to the camera. In the latter case, the camera is ordinarily tethered to the computer, which establishes field of view correction for the camera.

The advantage of the invention is that an electronic camera may be used with, e.g., a film handling mechanism without modification to the camera. For the purpose of capturing images on a film, the camera plugs into a nest which positions it to capture the images resident upon the film. The nest contains a film transport mechanism and an illuminator for illuminating the film. By utilizing a low cost digital camera tethered to a computer, the tethered camera captures images from the film in a manner similar to how it is used for office environment capture, and algorithms running on the computer modify the data captured to recreate the actual scene image, particularly from a negative film image. Errors in optical alignment between the camera and the image bearing media are compensated for by initially capturing an area larger than the desired image area. The desired image area is automatically presented to the user by the application, which determines the desired image area from the full captured area.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing film or electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 1:
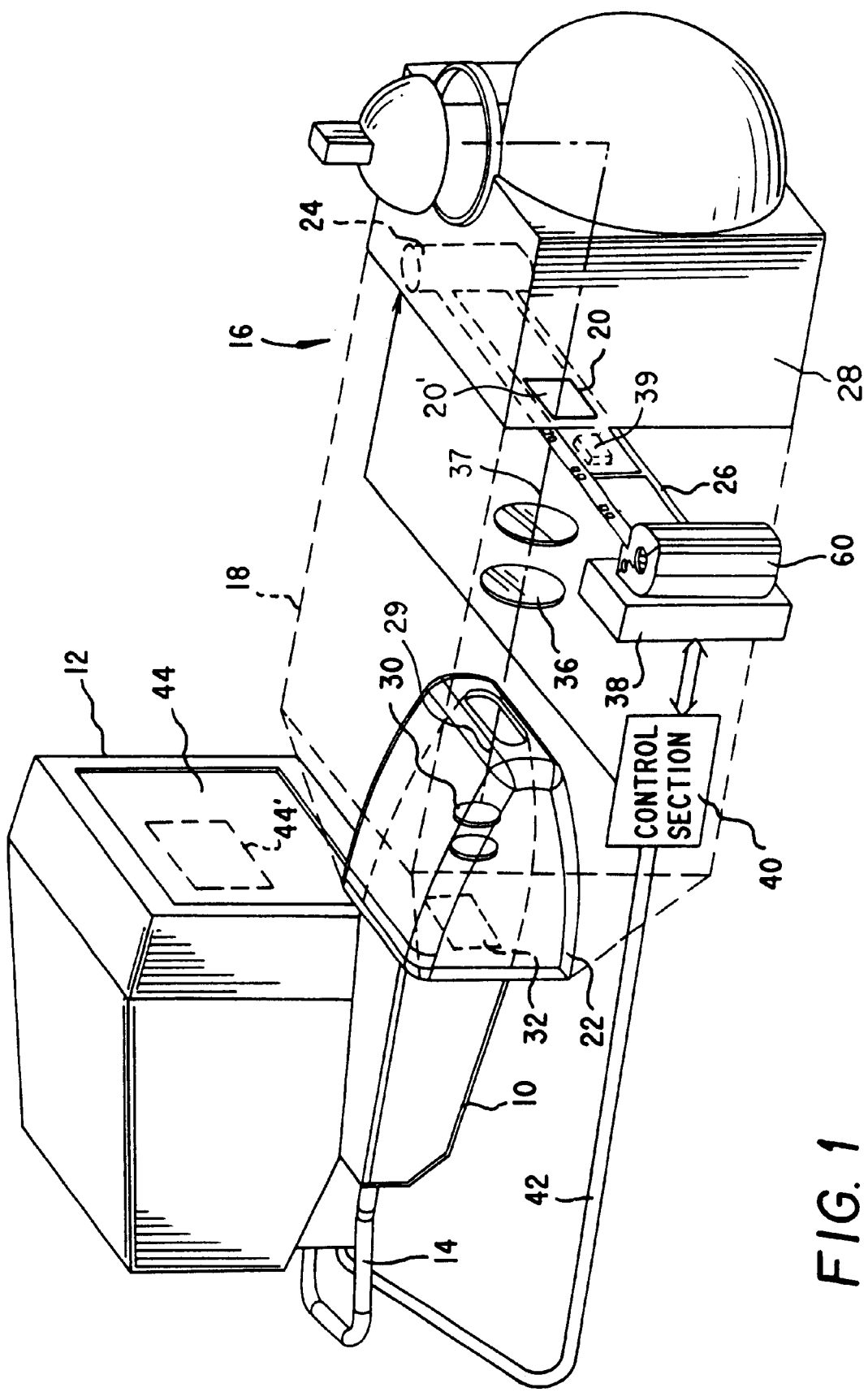
FIG. 1 is a diagram of an electronic photography system according to the invention including an electronic camera tethered to a computer, and a media handling mechanism, wherein the computer performs field of view correction.
Figure 3:
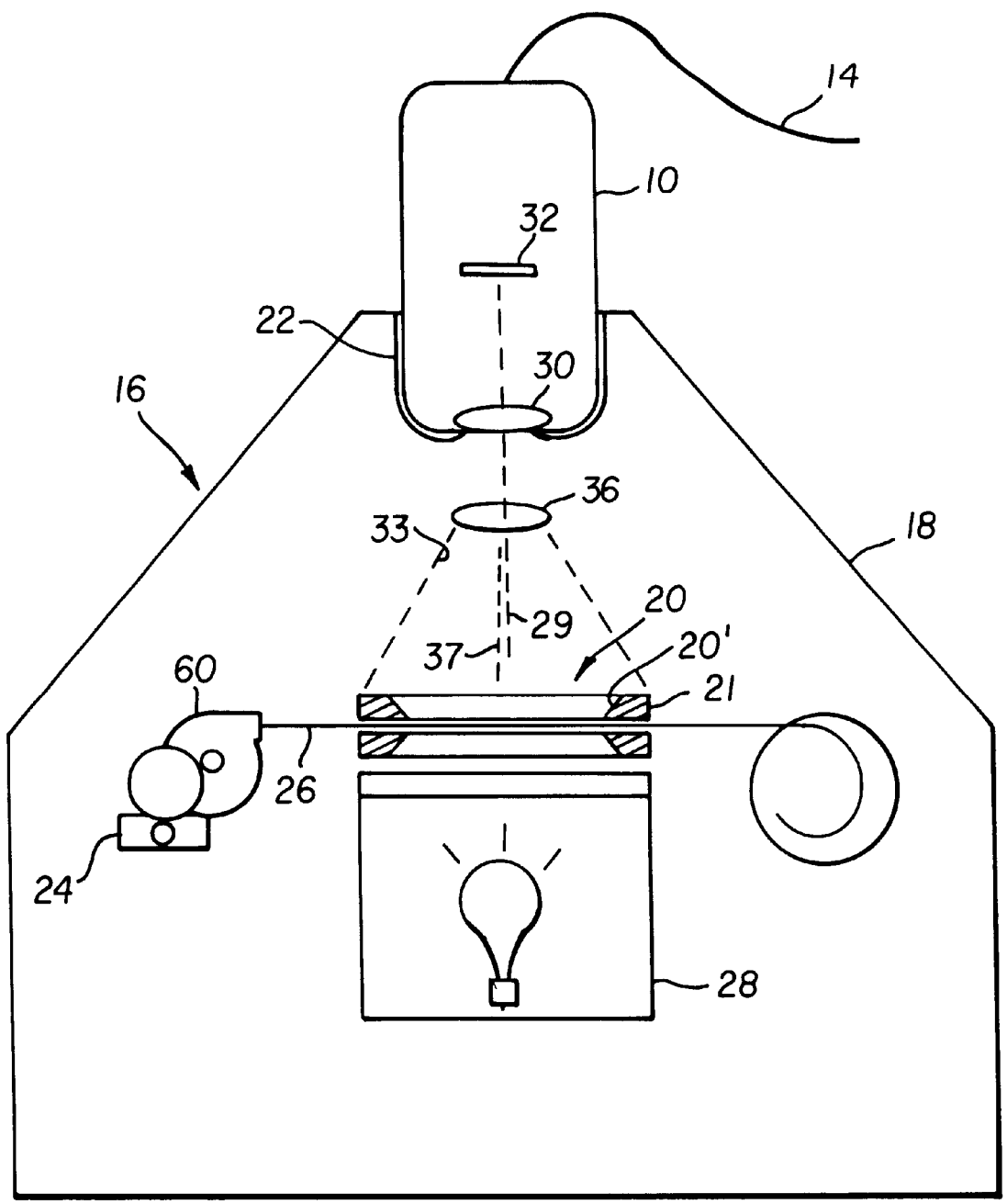
FIG. 3 is a schematic cross section of the camera inserted into a film handling mechanism, showing misalignment between their respective optical axes.
Figure 11:
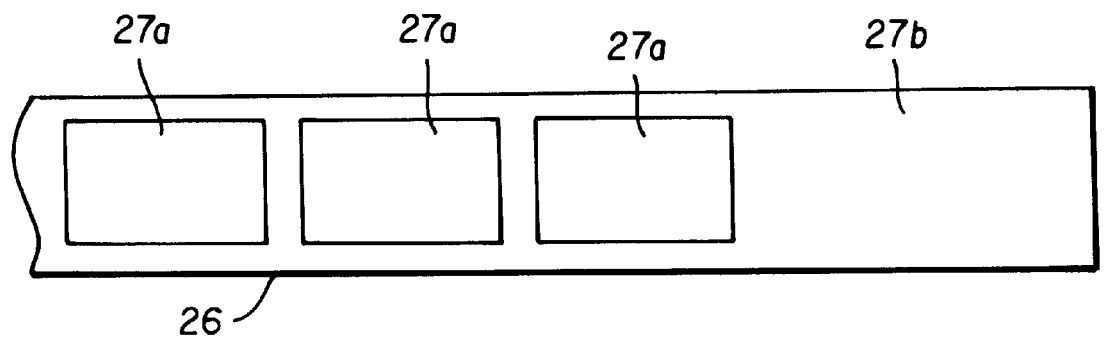
FIG. 11 is a diagram of a photographic film showing image bearing frames and a non-image bearing leader.

An electronic photographic system according to the invention includes an electronic camera for capturing images from image bearing media, a processor associated with the camera for storing and processing the images, and a media handling mechanism that mates with the electronic camera in order to support the image bearing media in relation to the electronic camera. The processor may be located in the electronic camera, or preferably in a host computer attached to the camera. If the processor is in the camera, field of view correction is established by the camera for images captured and stored by the camera. If the camera is tethered to a computer, and the processor is in the computer, field of view correction is established by the computer. As shown in FIG. 1 in connection with images on a film media that are transmitted to a processor in a host computer, the electronic photographic system includes a digital camera 10, tethered to a computer 12 by a cable 14, and a film handling mechanism 16, which mates with the digital camera 10 in order to support the a film 26 in relation to the digital camera 10. Although FIG. 1 shows the assembled system in a horizontal configuration, a cross section of key components in FIG. 3 shows an alternative arrangement of the assembled system in a vertical configuration, In either case, the film handling mechanism 16 includes a housing 18 having a framed region, shown as a film gate 20, for revealing an image bearing area of the film 26. The film gate includes an opening 20' in a plate 21 positioned at the film plane (shown best in FIG. 3) such that an opaque frame border is situated around the film image. In this way, only one film image at a time is illuminated and stray light from adjacent images, or border regions, does not deflect into the camera 10. As shown in FIG. 11, the film 26 includes image bearing frames 27a and a non-image bearing leader 27b at its forward end thereof.

The film handling mechanism 16 further includes a nest 22 for the camera 10, a film transport mechanism 24 for transporting the film 26, and a film illuminator 28. The nest 22 supports the digital camera 10 in a position that allows the camera 10 to image the film gate 20 through its camera optics 30 relative to its internal optical axis 29 upon an image sensor 32. More specifically, the camera 10 has a predetermined field of view 33 (shown in FIG. 3) that, when the camera 10 is supported in the nest 22, covers a field larger than the image bearing area of the media, i.e., larger than the image area of the film revealed through the film gate 20. The camera 10 also includes conventional signal processing and an interface for communicating an image signal obtained from the image sensor 32 through the cable 14 to the computer 12. Though not a required aspect of this invention, the camera 10 is preferably connected to the host computer 12 via a USB (universal serial bus) digital host interface, which also provides power to the camera 10. USB is a well-known shared bus that can be connected to other devices, such as keyboards, printers, etc. (USB is described in the Universal Serial Bus Specification, 1.0 Final Draft Revision, Nov. 13, 1995, which can also be viewed on the Web at http://www.teleport.com/-USB.)

The film transport mechanism 24 supports the film 26 for passage through the film gate 20 within the field of view of the camera 10, and the illuminator 28 illuminates the film 26 in the film gate 20. The film handling mechanism 16 also includes an optical section 36 arrayed along its own optical axis 37 in order to allow a camera designed for standard office environment viewing distances to change its field of view to correspond to a region somewhat larger than the image area of the film. The mechanism 16 preferably includes a sensor block 38 for sensing indicia, e.g., perforations, on the film 26 and a film detector 39 for sensing the entrance of the film leader 27b into the film gate 20. If the film has a magnetic recording region, the sensor block 38 further includes a magnetic head for sensing the recording region. In addition, the sensor block 38 senses bar code, such as conventionally found on 35 mm film or as a DX code on the 35 mm cassette, and alphanumeric characters. The film handling mechanism 16 may either be set up for a particular film size, e.g., 35 mm film, or for a variety of film sizes by, e.g., adjustment of the optical section 36 for different fields of view or adjustment of the position of the camera 10 within the nest 22. The film transport mechanism 24 and the sensor block 38 are connected to a control section 40, which interfaces through a cable 42 with the computer 12 for purposes of controlling the advance of the film 26. (Alternatively, the film 26 may be driven manually, e.g., by a hand operated crank (not shown) connected to the film transport mechanism 24. In that case, the connection between the mechanism 16 and the computer 12, i.e., the cable 42, may be dispensed with.) The image data from the camera 10 is processed for field of view correction by the host computer 12 to create final images that can be displayed on a computer monitor 44.

Figure 2:
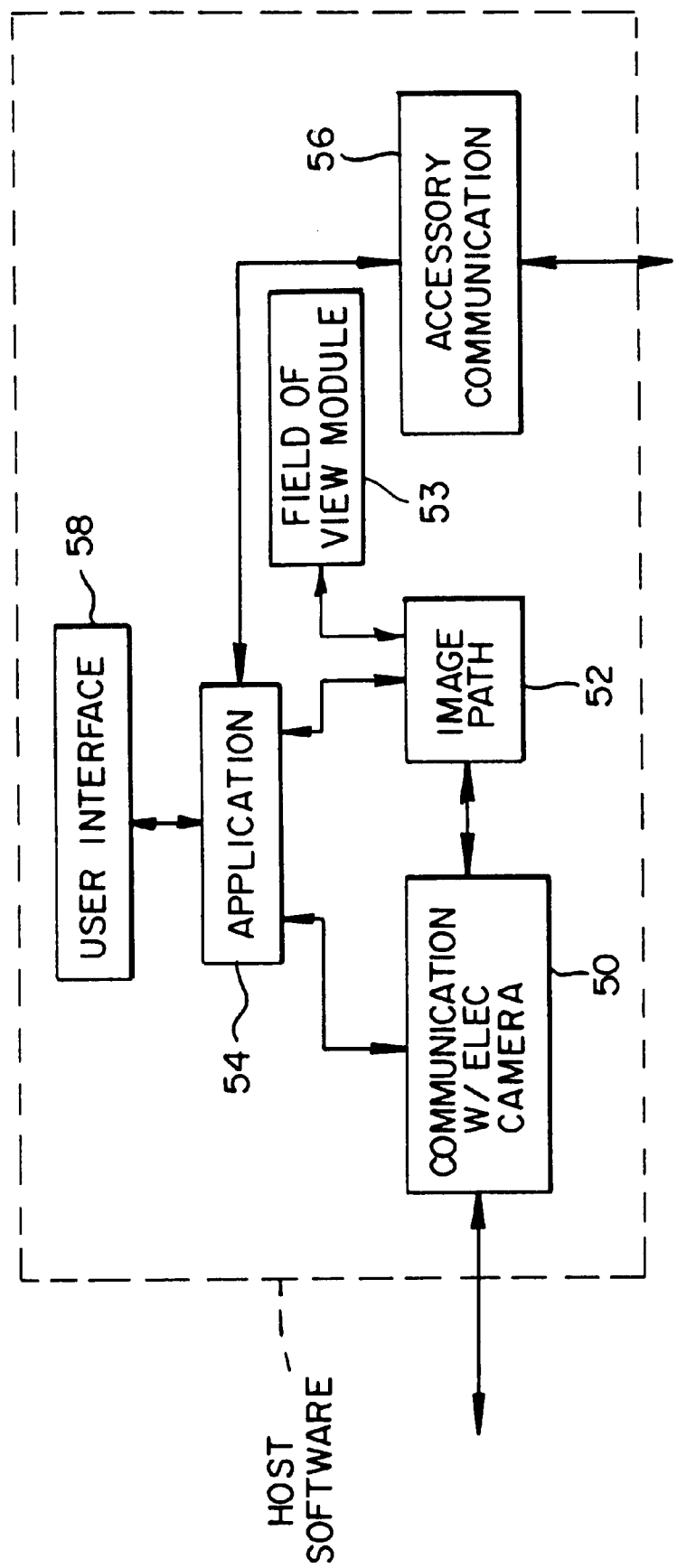
FIG. 2 is a block diagram of the program modules used in the computer to communicate with the camera and the media handling mechanism, and to perform field of view correction.

FIG. 2 outlines generally the program modules used in the computer 12 to communicate with the film handling mechanism 16 and the camera 10 and to process the image data from the camera 10. A communications module 50 provides the USB interface to the camera 10, and initially establishes an image path 52 with a field of view module 53, which performs a field of view correction. Thereafter the communications module 50 interfaces with an application program 54, which applies the field of view correction to subsequently captured images. Meanwhile, an accessory communications module 56 interfaces with the mechanism 16. The application 54 runs the user interface 58, which allows the user to operate the mechanism 16. For example, when the camera 10 is ready to capture images, a viewfinding window 44' (FIG. 1) on the computer screen 44 is used as a viewfinder. If there is an ability to move the film to adjust cropping, or to move optics in the optical section 36 to effect a zoom, the viewfinding window 44' on the computer screen will serve to inform the user of the portion of the image which will be captured. This image may be of inferior quality (color or resolution) to the final captured image. If the film 26 is negative film, the application 54 in the computer 12 will also invert the image. Additionally, using conventional algorithms, the computer 12 will eliminate the negative mask from the captured image so that the final stored file and resulting visualization on the computer's display will appear with colors closely approximating the original captured scene on the film 26.

The film 26 may either be one of several different film formats each of different frame size, or a single format film 26 may support more than one frame size, such as a panoramic frame size and a landscape frame size. If different film formats are used, then differently sized film gates 20 are typically used for each format. Given the field of view of the digital camera 10, the mechanism 16 may provide means to select between different optical sections in order to modify the field of view to correspond to the size of the film frame. In addition, the optical section 36 may be configured to provide a normal field coverage of the frame and a zoom field coverage of the frame. Preferably, as shown in FIG. 3, the film 26 is a cassette-loaded film with a transparent magnetic overlay on its non-emulsion side, e.g., the type of film used by an Advanced Photo System camera (such as a Kodak 3600IX camera sold by Eastman Kodak Company). Such a film is contained in a cassette 60 and includes a magnetic region for transmitting data stored on the film (such data may include, for example, frame by frame identity of frame size). Since the film 26 is completely contained within the cassette 60, the film transport mechanism 24 engages a thruster mechanism in the cassette 60 for thrusting the film 26 out of the cassette 60.

Ideally, the optical axes 29 and 37 of the camera 10 and film handling mechanism 16 coincide when the camera 10 is inserted into the mechanism 16. However, when the film handling mechanism 16 is constructed, a number of tolerances build up. For example, there is a tolerance from the film plane to the lens 36, and from these elements to the nest portion 22 of the case which is designed to hold the electronic camera 10. These tolerances must be taken into account in determining the pointing accuracy of the camera 10 relative to the film plane in the mechanism 16. There is also a tolerance build up in the electronic camera 10 between its sensor 32 and its optical elements 30, and between these elements and the housing of the camera. These electronic camera tolerances must also be taken into account. Additionally, there is some tolerance between the camera 10 and the mechanism 16 when the camera 10 is inserted into the mechanism 16. Thus the field of view of the camera 10 is not well controlled in relation to the film handling mechanism 16. The situation is illustrated in FIG. 3, which shows a cross-sectional diagram of the camera 10 as typically inserted into the film handling mechanism 16. In this state, the optical axis 29 of the camera 10 may not align completely with the optical axis 37 of the mechanism 16 due to tolerances which accumulate in manufacture. Additionally, the aspect ratio of the camera 10 may not match that of the film. It is thus desirable to automatically eliminate this mismatch in such a fashion that the user is unaware of the problem.

Accordingly, the electronic photographic system provides correction for field of view misalignment. In particular, as shown in the flow diagram of FIG. 4, a calibration sequence is executed when the camera 10 is inserted in the film handling mechanism 16 such that compensation is obtained for subsequent image capture. While this compensation is mainly described in terms of a correction for a pointing error, the same procedure will compensate for mismatches in aspect ratio between the camera sensor and the images on the image bearing media.

Figure 6:
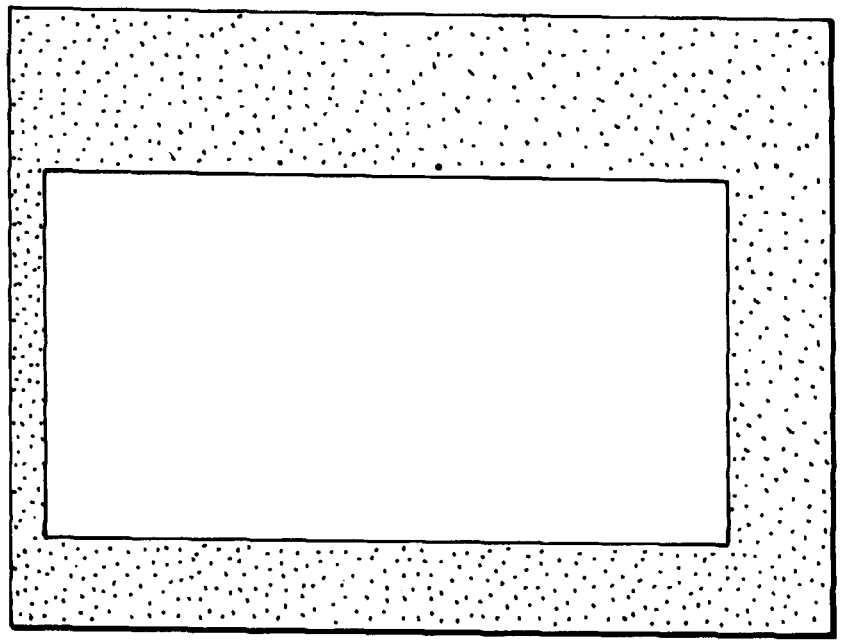
FIG. 6 is a diagram of a calibration image of the film gate, showing respective light and dark areas.

After the digital camera 10 is securely positioned in the receiving nest 22 of the film handling mechanism 16, the camera 10 is directed by the computer 12 to capture a calibration image of either the open film gate, or a non-image bearing portion of the image bearing medium (leader of film) revealed through the open film gate 20. (If the illumination is intense, the non-image bearing leader 27b may need to be in the film gate 20 to prevent saturation of the image sensor 32). In either case, an image bearing frame area 27a of the film 26 is not resident in the film gate 20. The film illuminator 28 must be lighting the film gate 20 at this time. As shown in FIG. 6, this calibration image will be dark and light, the dark portions corresponding to the non-image frame area of the gate 20 and the light portions corresponding to the opening 20'. This dark and light image data is acquired because the field of view 33 of the digital camera 10 is larger than the open area 20' of the film gate 20. This image data is used by the computer 12 to determine where the image bearing area will be in relation to the full frame captured by the camera. This is done by first determining the light and dark areas of the image. That area which is light corresponds to the image bearing area of the film, and that which is dark corresponds to the film handling mechanism and other portions of the mechanism which are not important to the user.

Figure 4:
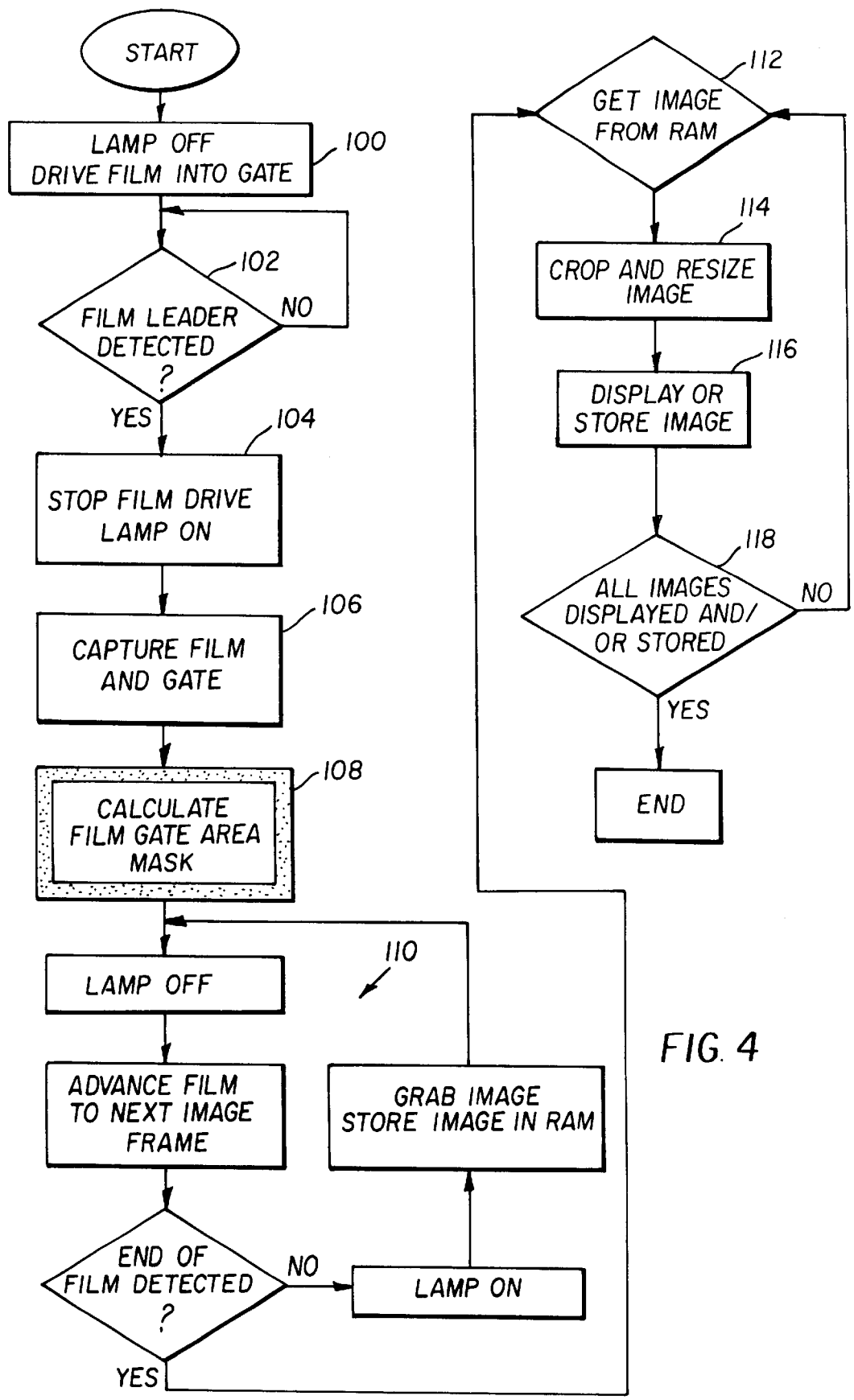
FIG. 4 is a flow diagram illustrating the operation of the system shown in FIG. 1.
Figure 5:
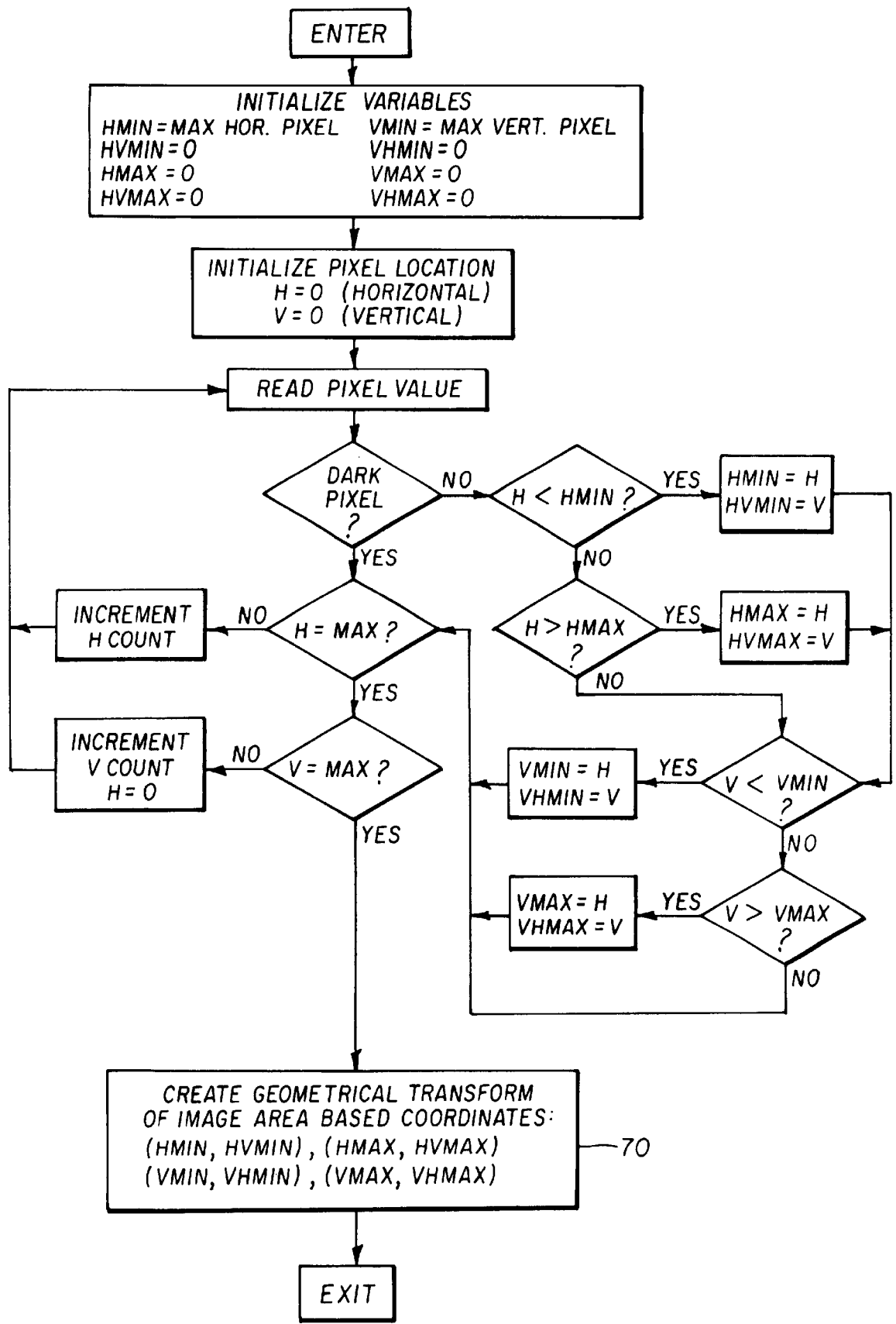
FIG. 5 is a flow diagram illustrating one embodiment of the field of view correction.

As shown in FIG. 4, the illuminator 28 is initially off as the film 26 is driven into the gate 20 (step 100). When the film leader 27b is detected by the film detector 39 (step 102), the film drive 24 is stopped and the illuminator 28 is turned on (step 104). The computer 12 then instructs the camera 10 to capture a calibration image of the film gate area (step 106) with the leader 27b occupying the opening 20'. A typical calibration image is shown in FIG. 6. Once the image is captured, the field of view module 53 (FIG. 2) is enabled (step 108) and the region of the light area is calculated, which is referred to in the flow diagram as the gate area mask. A specific algorithm for calculating the gate area mask is shown in FIG. 5 in the form of a flow chart. The result of the calculations is a set of image coordinates that define the image bearing area in relation to the full image captured by the image sensor. Once the mask has been determined, the computer 12 proceeds to instruct the digital camera 10 to capture images of the image portions of the film (steps 110). This involves advancing the film 26 through the film gate 20 until the end of the film is detected and all the images have been captured and stored in RAM in the computer 12. Now that all the images are captured, each image is recovered one by one from computer RAM (step 112) and then cropped and resized (step 114) according to the coordinates developed from the film gate mask calculation (step 108). Each image is displayed or stored (step 116), and the process is repeated until all images are cropped, resized and displayed or stored (step 118).

Since the field of view 33 of the camera 10 is larger than the image bearing region of the media being scanned, the two dimensional array of image pixels generated by the image sensor 32 includes the opaque border area surrounding the film gate area mask. As shown in FIG. 5, the algorithm for calculating the film gate area mask is based on distinguishing between dark and light pixels, that is, between high and low optical density image areas. Since the film gate area mask (open gate area) has a generally rectangular configuration, the procedure shown in FIG. 5 generates the four corner coordinates of the rectangle, that is, (hmin, hvmin), (hmax, hvmax), (vmin, vhmin), (vmax, vhmax), as the image data is streamed through the algorithm. These coordinates are then used during subsequent image capture to isolate the image bearing region of the two dimensional array of pixels generated by the image sensor 32.

Figure 7:
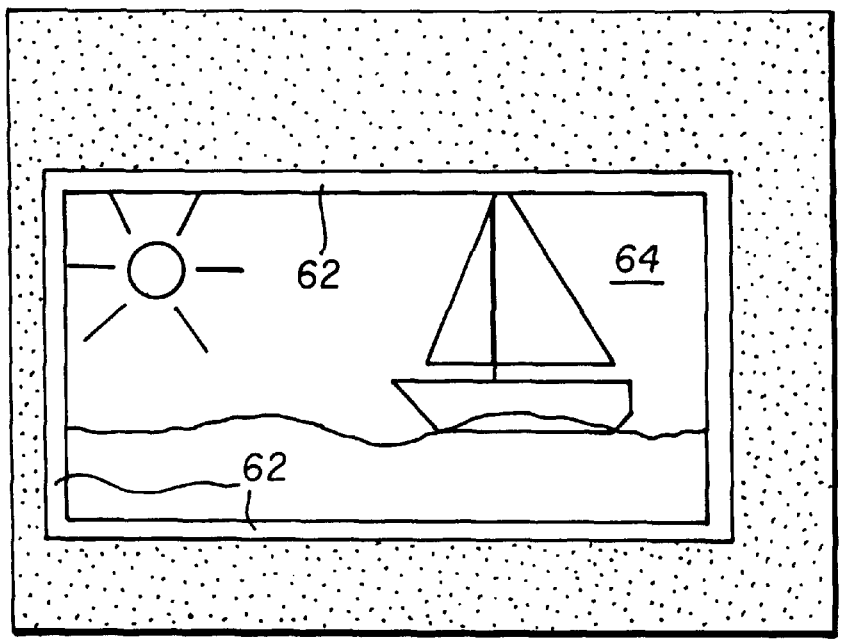
FIG. 7 is a diagram showing a captured image having an unwanted light area in addition to the image area.
Figure 8:
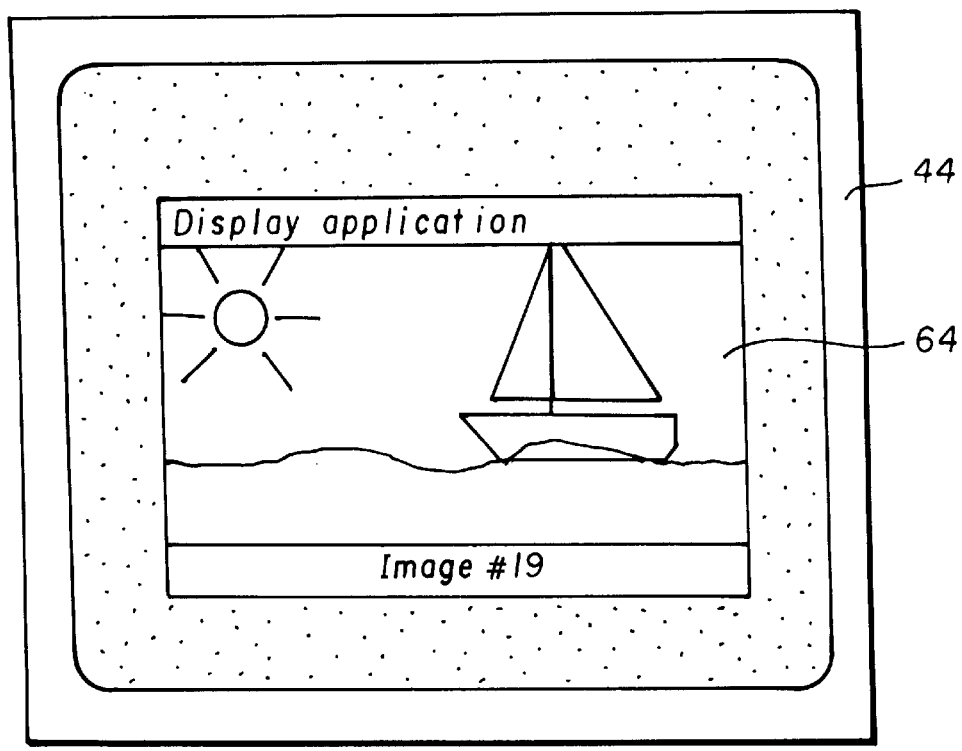
FIG. 8 is a diagram of an application appearing on a monitor and including an image bearing area.

As shown in FIG. 7, there may be some light area 62 in the captured data which does not correspond to an image bearing area 64. If that is the case, the computer must have prior information as to the mismatch between the light area and the image area so that compensation can be made. However, in practice, such a situation is usually avoided so as to maximize the optical performance of the system. Once the light area corresponding to the image bearing area 64 has been determined, the computer can proceed to instruct the camera to capture images of the image bearing portions of the film. As shown in FIG. 8, the image bearing area 64 is displayed on the monitor 44. Before displaying or saving the images, the computer crops all portions of the image delivered from the camera which have been determined not to contain image information. Thus the user need never observe the non-image bearing portions of captures. It may also be desired that the computer automatically resize the resulting image to some standard size. Further cropping may be necessary to achieve a standard size. Such cropping and resizing can be accomplished with conventional program-based techniques.

Figure 9:
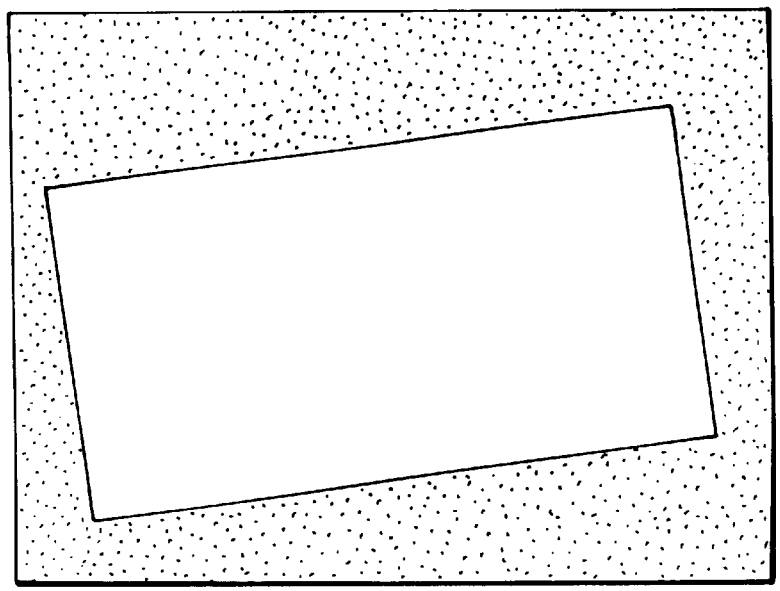
FIG. 9 is a diagram showing a rotational mismatch between the field of view of the camera and the image bearing area of the film.

There may also be some rotational mismatch between the field of view of the camera and the image bearing area of the film (as shown in FIG. 9). In this case, the computer would either determine the angle of rotation and discard some of the image area to create a rectangular image, display the entire image plus a portion of the non-image area as rotated (perhaps masking the non-image area), or interpolate a new image from the captured image to eliminate the rotation. FIG. 5 shows an approach in which the four corner coordinates of a rectangle, including a rotated rectangle (that is, (hmin, hvmin), (hmax, hvmax), (vmin, vhmin), (vmax, vhmax) in their rotated locations), are determined as the image data is streamed through the algorithm. These coordinates are then used in a geometrical transform stage 70 (see FIG. 5) to rotate the image pixels and isolate the image bearing region of the two dimensional array of pixels generated by the image sensor 32. (Such geometrical transforms are well-known to those of ordinary skill in this art, and need not be further described here.)

Figure 10:
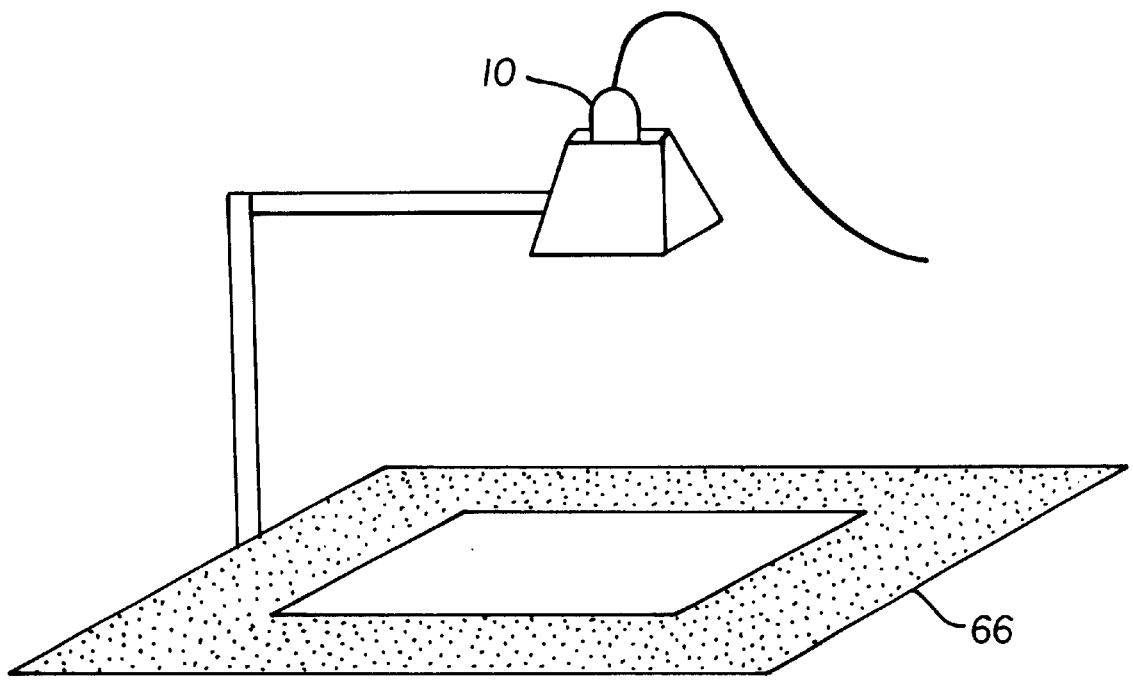
FIG. 10 is a diagram showing an alternative embodiment for capturing reflective images.

Although a system for capturing film images has been described, the same method could be used to ensure reflective images are cropped properly for display. As shown in FIG. 10, a platen 66, which is used to support the reflective images of a given size, would.be of a contrasting color to the surrounding area, and an initial capture of the platen 66 would be made so that a similar calibration sequence could be accomplished.

The invention has been described with reference to a preferred embodiment. However, it will be appreciated that variations and modifications can be effected by a person of ordinary skill in the art without departing from the scope of the invention. For instance, although the preceding description is for a tethered electronic camera, it is understood that a similar calibration procedure could be executed with a fully independent camera by means of similar techniques. In this case, the processor associated with the electronic camera for initiating capture of an open gate area and for determining the coordinates of the image bearing area would be part of the camera (or the film handling mechanism) rather than in a separate computer.

PARTS LIST 10 digital camera
12 computer
14 cable
16 film handling mechanism
18 housing
20 film gate
20' opening
21 plate
22 nest
24 film transport mechanism
26 film
27a image bearing frame
27b non-image bearing leader
28 illuminator
29 optical axis
30 camera optics
32 image sensor
33 field of view
36 optical section
37 mechanism optical axis
38 sensor block
39 film detector
40 control section
42 cable
44 computer monitor
44' viewfinding window
46 image frame
48 print area
50 communications module
52 image path
53 field of view module
54 application program
56 accessory communications module
58 user interface
60 cassette
62 light area (non image)
64 light area (image)
66 platen
70 geometrical transform stage

What is claimed is:

1. An imaging system incorporating field of view correction of images captured from image bearing media, said system comprising:

an electronic camera having a predetermined field of view for capturing images of the image bearing media;

a handling mechanism separable from the electronic camera for supporting the image bearing media, said handling mechanism including a framed region for revealing an image bearing area of the media to the electronic camera and means for supporting the electronic camera in a position that images the framed region while capturing a field of view larger than the image bearing area of the media; and a processor associated with the electronic camera for initiating capture of an image of the framed region in the absence of an image bearing area of the media and for determining the coordinates of the image bearing area from the image of the framed region, whereby the coordinates of the image bearing area are used for field of view correction of subsequently captured images.

2. An imaging system as claimed in claim 1 wherein the image bearing media is photographic film.

3. An imaging system as claimed in claim 1 wherein the image bearing media is a photographic print.

4. An imaging system as claimed in claim 1 wherein the processor includes a display for displaying the images of the image bearing media and the image bearing area of the media is displayed without displaying non-image bearing areas also captured by the electronic camera.

5. An imaging system as claimed in claim 1 wherein the processor resizes the image bearing area of the captured image through interpolation.

6. An imaging system as claimed in claim 1 wherein the processor corrects a rotational mismatch between the field of view of the camera and the image bearing area of the media.

7. An imaging system as claimed in claim 1 wherein the processor obtains an image of the framed region including a non-image bearing region of the media.

8. An imaging system as claimed in claim 1 wherein the framed region includes a frame of high optical density surrounding an area of lower optical density and the processor determines the image bearing area from an analysis of the difference in optical densities.

9. An imaging system as claimed in claim 8 wherein the determined image bearing area is used by the processor to extract the image bearing area from subsequent images of the image bearing media.

10. An imaging system as claimed in claim 1 wherein the processor is resident in a computer connected to the electronic camera.

11. An imaging system for capturing images recorded on a film and transmitting the captured images to a computer, said system comprising:

an electronic camera having a predetermined field of view for capturing images recorded on the film;

a film handling mechanism for supporting the film, said film handling mechanism including a film gate having an aperture for exposing an image bearing area of the film to the electronic camera, means for illuminating the film gate, and means for supporting the electronic camera in a position that images the film gate while capturing an area larger than the image bearing area of the film, said supporting means allowing removal of the camera from the film handling mechanism; and wherein the computer initiates capture of an image of the film gate in the absence of an image bearing area of the film and determines the coordinates of the image bearing area from the image of the illuminated film gate.

12. An imaging system as claimed in claim 11 wherein the computer includes a display for displaying the images of the image bearing media and the image bearing area of the media is displayed without displaying non-image bearing areas also captured by the electronic camera.

13. An imaging system as claimed in claim 11 wherein the computer resizes the image bearing area of the captured image through interpolation.

14. An image system as claimed in claim 11 wherein the computer corrects a rotation mismatch between the field of view of the camera and the image bearing area of the film.

15. An imaging system as claim in claim 11 wherein the computer obtains an image of the framed region including a non-image bearing leader of the film.

16. An imaging system as claimed in claim 11 wherein the framed region includes a frame of high optical density surrounding an area of lower optical density and the computer determines the image bearing area from an analysis of the difference in the optical densities.

17. An imaging system as claimed in claim 16 wherein the determined image bearing area is used by the computer to extract the image bearing area from subsequent images of the image bearing film.

18. An imaging system including an electronic camera for capturing images of image bearing media, a computer connected to the camera, and an image bearing media handling accessory, the improvement wherein:

the electronic camera inserts into the image bearing media handling accessory and captures a field of view of a region comprising a frame that is larger than an image bearing area of the media; and the image bearing area is determined by the computer on the basis of detecting the region comprising a frame from an image captured without an image bearing media in the field of view.

19. An imaging system as claimed in claim 18 wherein the image bearing media is photographic film.

20. An imaging system as claimed in claim 18 wherein the image bearing media is a photographic print.

21. An imaging system as claimed in claim 18 wherein the computer includes a display for displaying the images of the image bearing media and the image bearing area of the media is displayed without displaying non-image bearing areas also captured by the electronic camera.

22. An imaging system as claimed in claim 18 wherein the computer resizes the image bearing area of the captured image through interpolation.

23. A method of incorporating field of view correction into the electronic capture of images from image bearing media that is positioned in a gate, said method comprising the steps of:

supporting an electronic camera in a position that images the gate while capturing a field of view larger than the image bearing area of the media;

obtaining an image of the gate in the absence of an image bearing area;

determining the image bearing area from the image of the gate; and calculating a field of view correction based on the determined image bearing area.

24. A method as claimed in claim 23 wherein the field of view corrections are applied to subsequently captured images.

* * * * *